(12) United States Patent
Kawabe et al.

(10) Patent No.: US 7,952,819 B2
(45) Date of Patent: May 31, 2011

(54) OPTICAL DEVICE, LIGHT IRRADIATION APPARATUS AND LIGHT IRRADIATION METHOD

(75) Inventors: Hideo Kawabe, Tokyo (JP); Naoji Nada, Tokyo (JP); Ryo Koshi Ishi, Tokyo (JP)

(73) Assignee: Sony Corporation, Tokyo (JP)

( * ) Notice: Subject to any disclaimer, the term of this patent is extended or adjusted under 35 U.S.C. 154(b) by 857 days.

(21) Appl. No.: 11/279,362

(22) Filed: Apr. 11, 2006

(65) Prior Publication Data

US 2006/0226381 A1    Oct. 12, 2006

(30) Foreign Application Priority Data

Apr. 12, 2005    (JP) ............................. JP2005-114858

(51) Int. Cl.
*G02B 7/02* (2006.01)
(52) U.S. Cl. ..................... 359/808; 359/811; 359/819
(58) Field of Classification Search .............. 359/808, 359/811, 813, 819, 630, 631, 633, 636, 637, 359/639; 345/7, 8
See application file for complete search history.

(56) References Cited

U.S. PATENT DOCUMENTS

| 5,525,810 | A | * | 6/1996 | Jewell et al. | 250/566 |
| 5,701,131 | A | * | 12/1997 | Kuga | 345/8 |
| 5,822,133 | A | * | 10/1998 | Mizuno et al. | 359/696 |
| 6,621,639 | B2 | | 9/2003 | Kalhert et al. | |
| 7,446,733 | B1 | * | 11/2008 | Hirimai | 345/32 |
| 2002/0041444 | A1 | | 4/2002 | Kalhert et al. | |

FOREIGN PATENT DOCUMENTS

| JP | 63-80088 | 5/1988 |
| JP | 06-069928 | 3/1994 |
| JP | 8-338962 | 12/1996 |
| JP | 11-156579 | 6/1999 |
| JP | 11-352419 | 12/1999 |
| JP | 2000-167682 | 6/2000 |
| JP | 2001-350117 | 12/2001 |
| JP | 2002-224877 | 8/2002 |

OTHER PUBLICATIONS

Japanese Office Action issued on Nov. 24, 2009, for corresponding Japanese Patent Application JP 2005-114858.

* cited by examiner

*Primary Examiner* — Jessica T Stultz
*Assistant Examiner* — Brandi N Thomas
(74) *Attorney, Agent, or Firm* — K&L Gates LLP

(57) ABSTRACT

An optical device is provided. The optical device including an optical member having a first main surface and a second main surface, which respectively serve as an entrance surface and an exit surface for light from a directional light source, and made of a material having a refractive index greater than 1; and a support member at least including swing means for the optical member, wherein the first and second main surfaces of the optical member swingable by the support member are able to be inclined with respect to an optical path of the light from the directional light source.

12 Claims, 6 Drawing Sheets

OPTICAL DEVICE, LIGHT IRRADIATION APPARATUS AND LIGHT IRRADIATION METHOD

CROSS REFERENCES TO RELATED APPLICATIONS

The present application claims priority to Japanese Patent Application JP2005-114858, filed in the Japanese Patent Office on Apr. 12, 2005, the entire contents of which being incorporated herein by reference.

BACKGROUND

The present application relates to an optical device which defines an optical path of light emitted from a directional light source, a light irradiation apparatus having the optical device, and a light irradiation method.

In the field of directional light sources such as lasers and LEDs (Light Emission Diodes), it is requested to form desired light by selecting the spot shape, the spot size, the light amount, the energy profile and the like of directional light emitted from such a light source.

For example, laser light is widely used in various processes, such as laser repair, laser anneal, laser cleaning and laser etching, which are used in defect repair of photomasks for use in manufacture of semiconductor devices, liquid crystal displays or organic electroluminescence displays and are also used in wiring repair of TFT circuit boards. However, the quality of a laser beam is not always in the desirable state for processing when the laser beam is emitted from a light source. For example, if a large variation occurs in energy intensity in a plane of a laser beam, which is planar, i.e., orthogonal to the optical path thereof, the large variation causes processing nonuniformity (a variation in processing rate) in a processing target surface of a light irradiation target to be processed.

To cope with this disadvantage, the above-mentioned processes have heretofore employed laser light which is formed and irradiated with a reduced energy variation by passing only the section of a laser beam which does not contain a large energy variation in cross section through a slit or the like, or by enlarging the beam width through a lens or the like and reducing the energy variation, after having measured a planar energy intensity distribution, i.e., energy profile, of the laser beam. However, these methods produce large energy losses, because the energy of the beam section blocked by the slit is lost and because the energy density of the laser beam to be used in irradiation with an enlarged beam width is decreased.

On the other hand, it has been proposed to provide a method of reducing a variation in energy distribution in a laser beam by a technique such as the technique of averaging beam profiles while reflecting the laser beam by a multiplicity of times by using an optical element called a homogenizer (see, Japanese Patent Application Publication No. Hei8-338962, Japanese Patent Application Publication Hei11-352419, Japanese Patent Application Publication 2001-350117 and Japanese Patent Application Publication 2002-224877).

However, in general, a homogenizer needs a complicated construction and is made of a large number of parts, and causes an increase in the cost required to construct a light irradiation apparatus for laser processing, i.e., an optical system.

In the light irradiation apparatus, various optical elements, such as a mirror for introducing light to a processing target section which is a section in which an irradiation target is to be disposed, and a lens for reducing the diameter of a light spot, are provided on an optical path of directional light emitted from a directional light source such as a laser light oscillation source. However, if the structure of the homogenizer is complicated, when, for example, a variation in the status of a laser beam (such as a variation in the beam profile or a deviation of the optical axis) occurs due to any apparatus trouble, the entire optical mechanism of the light irradiation apparatus needs to be re-adjusted in accurate response to the variation. As a result, troubleshooting cannot be completed in a short time and recovery of the apparatus takes long time.

Furthermore, there may occur a variation in a beam status which is difficult to handle with only the adjustment of the optical system. In this case, the specifications of the homogenizer itself need to be modified or changed, but the homogenizer needs to be designed for each individual laser, for example, by measuring the profile of laser light, according to the construction of the directional light source constituting the light irradiation apparatus or the construction of the entire light irradiation apparatus. As a result, it is also difficult to presume a variation in the beam status and prepare a replacement homogenizer in advance. For this reason, it is particularly desired that the optical system of a light irradiation apparatus used at the point of production be made as simple as possible in construction.

SUMMARY

The present invention has been made in view of the above-mentioned circumstances, and provides a light irradiation apparatus capable of forming desired directional light without an increase in the complexity of an optical system construction, and an optical device constituting the light irradiation apparatus, as well as a light irradiation method using such light irradiation apparatus and optical device.

An optical device according to an embodiment has an optical member having a first main surface and a second main surface, which respectively serve as an entrance surface and an exit surface for light from a directional light source, and made of a material having a refractive index greater than 1, and a support member at least including swing means for the optical member. The first and second main surfaces of the optical member swingable by the support member are able to be inclined with respect to an optical path of the light from the directional light source.

More specifically, the optical device according to an embodiment is capable of compensating the disadvantages of the related art. For example, when processing using laser light is to be performed, the optical member such as a glass plate is inserted at an intermediate position into an optical path of a laser beam which extends from a laser light oscillation source to a processing target section, and during light irradiation, the optical axis of laser light is intentionally shifted by varying the angle of the optical member with respect to the optical axis, and furthermore, the optical axis of the directional light source is swung with respect to the processing target surface by a mechanism which automatically swings the angle of the optical member.

A light irradiation apparatus according to an embodiment at least has a directional light source and an optical device which defines an optical path of light from the directional light source. The optical device has an optical member having a first main surface and a second main surface, which respectively serve as an entrance surface and an exit surface for light from the directional light source, and made of a material having a refractive index greater than 1, and a support member at least including swing means for the optical member. The first and second main surfaces of the optical member swingable by the support member are able to be inclined with respect to the optical path of the light from the directional light source.

A light irradiation method according to an embodiment has an optical-member arranging step of arranging an optical device having a first main surface and a second main surface and made of a material having a refractive index greater than 1, in such a manner that the first main surface and the second main surface are inclined with respect to an optical path of light from a directional light source, and a light irradiation step of performing predetermined light irradiation by defining the optical path of the light from the directional light source by means of swing of the optical member.

The optical device according to an embodiment has the optical member having the first main surface and the second main surface and made of a material having a refractive index greater than 1, and the support member at least made of the swing means for the optical member. The first and second main surfaces of the optical member swingable by the support member are able to be inclined with respect to the optical path of the light from the directional light source. Accordingly, the optical device is capable of improving the optical characteristics of the light from the directional light source such as a laser, as to at least any one of spot shape, spot size, light amount and energy profile.

The light irradiation apparatus according to an embodiment invention at least has the directional light source and the optical device which defines the optical path of light from the directional light source. The optical device has the optical member having the first main surface and the second main surface and made of a material having a refractive index greater than 1, and a support member at least including the swing means for the optical member. The first and second main surfaces of the optical member swingable by the support member are able to be inclined with respect to the optical path of the light from the directional light source. Accordingly, the nonuniformity of irradiation energy on a processing target surface due to the nonuniformity of the profile of directional light such as laser light can be ameliorated with the averaging of energy, so that the processing accuracy and the processing reliability of a process using laser light can be improved, and furthermore, costs required for the construction, i.e., manufacture, of the apparatus can be reduced.

The light irradiation method according to an embodiment has the optical-member arranging step of arranging the optical device having the first main surface and the second main surface and made of a material having a refractive index greater than 1, in such a manner that the first main surface and the second main surface are inclined with respect to the optical path of light from the directional light source, and the light irradiation step of performing predetermined light irradiation by defining the optical path of the light from the directional light source by means of the swing of the optical member. Accordingly, even if a deviation of the optical axis or a variation of a profile occurs, a mechanism section for averaging a beam, i.e., the optical member, need not be re-adjusted in response to such variation. Accordingly, the present invention can provide important and numerous advantages; for example, the time required to cope with apparatus trouble occurring at the point of production, i.e., the time required for troubleshooting, can be reduced, so that productivity can be improved in mass production as well.

Additional features and advantages are described herein, and will be apparent from, the following Detailed Description and the figures.

BRIEF DESCRIPTION OF THE FIGURES

The present application will become more readily appreciated and understood from the following detailed description of embodiments and examples of the present invention when taken in conjunction with the accompanying drawings, in which.

DETAILED DESCRIPTION

Embodiments of the present invention will be described below in detail with reference to the accompanying drawings.

Optical Device

Figure 1A:
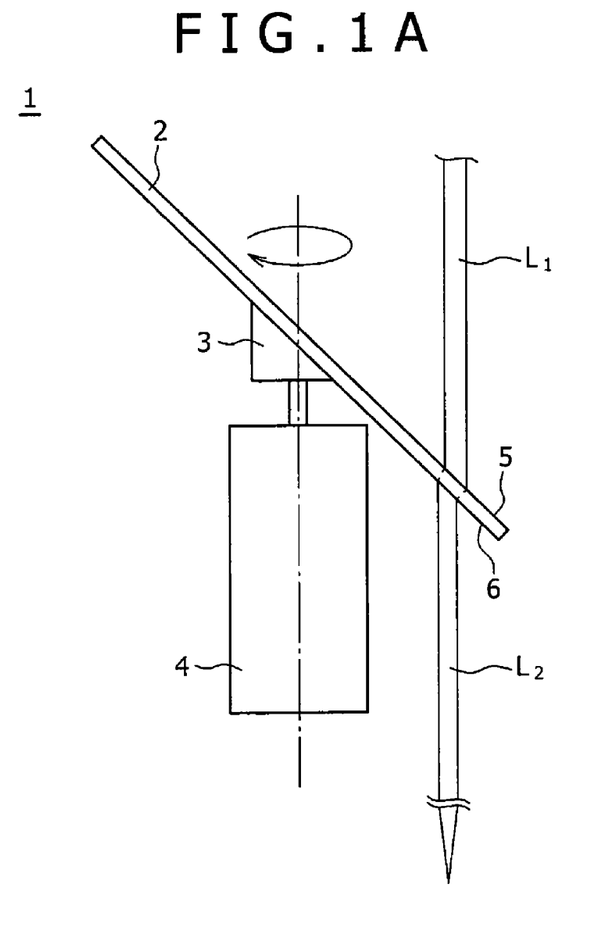
FIG. 1A is a schematic construction view showing the construction of an optical device according to an embodiment.

First of all, an embodiment of an optical device will be described below. As shown in FIG. 1A, an optical device 1 according to an embodiment has an optical member 2 made of, for example, glass and a support member 4 at least including swing means 3 for the optical member 2. The optical member 2 has a first main surface 5 and a second main surface 6 which are arranged approximately in parallel with each other in the present embodiment and respectively serve as an entrance surface and an exit surface for light emitting from a directional light source (not shown) such as a laser which will be mentioned later. The optical member 2 is made of a material having a refractive index greater than 1, and the first and second main surfaces 5 and 6 are supported in the state of being inclined with respect to the optical axis of light from the directional light source via the swing means 3 by the support member 4.

Figure 2:
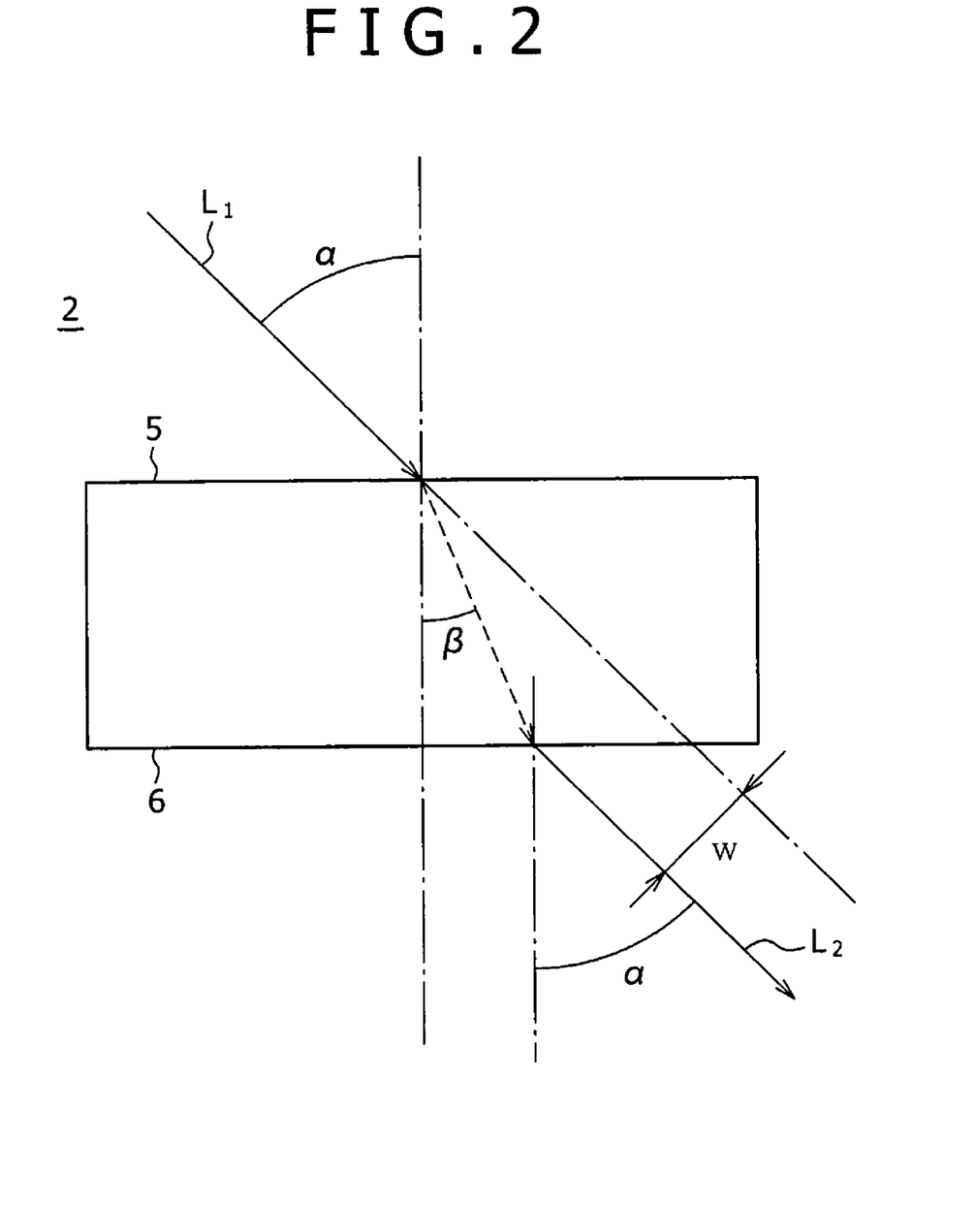
FIG. 2 is a schematic diagram for explaining an optical member constituting the optical device according to an embodiment.

During refraction and transmission of the directional light through the optical member 2, as shown in FIG. 2, a deviation width w occurs between the optical axis of entering light $L_1$ and the optical axis of exiting light $L_2$. The deviation width w is based on a refractive angle $\beta$ which occurs inside the optical member 2 with respect to an incident angle $\alpha$ to the first main surface 5 of the optical member 2 and an exiting angle $\alpha$ from the second main surface 6 of the optical member 2. The deviation width w can be selected and adjusted, as by selecting the angle of the optical axis of the entering light $L_1$ with respect to the first main surface 5, the thickness of the optical member 2, and the constituent material of the optical member 2.

More specifically, light which is incident at the incident angle α with respect to a surface, i.e., the first main surface 5, of the optical member 2 made of, for example, glass is refracted at the interface between glass and air and the direction of travel is turned to the direction of the refractive angle β. On the other hand, when the incident light reaches the back surface of the glass plate, i.e., the second main surface 6, the light is again refracted to the direction of the incident angle α and exits from the second main surface 6. If A denotes the refractive index of air and B denotes the refractive index of glass, the angles α and β can be defined by formula 1. In this case, the optical axis of exiting light (corresponding to the exiting light $L_2$) can be swung by swinging the angle of the optical member 2 relative to the entering light $L_1$ at least between positive and negative values centered at a plane orthogonal to the optical axis (for example, approximately between −45° and +45°). The amplitude of the optical axis of the exiting light, i.e., the deviation width, can be adjusting by selecting the thickness, the material, the swing angle and the like of the optical member 2; if the profile variation of the laser is small, the swing angle may be decreased, whereas if the profile variation of the laser is large, the swing angle may be increased.

$$\operatorname{Sin}(\alpha)/\operatorname{Sin}(\beta) = B/A \quad \text{Formula 1}$$

In the optical device 1 constructed in this manner, when the optical member 2 is continuously rotated about a swing axis approximately parallel to the optical paths of the entering light $L_1$ and the exiting light $L_2$ by the swing means 3 coupled to, for example, a motor (not shown), i.e., when the inclination of the optical member 2 relative to the optical axis of the laser is varied with the rotation of the motor, the optical axis of the exiting light $L_2$ reflected and transmitted through the optical member 2 makes a circular motion with a specific radius on a plane orthogonal to the optical axis.

Figure 1B:
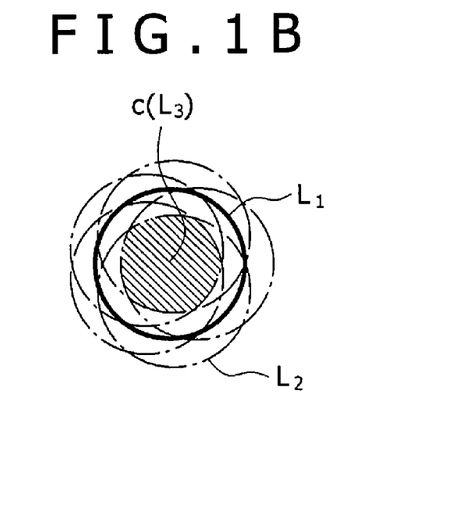
FIG. 1B is a schematic diagram for explaining one example of directional light obtained by an embodiment of a light irradiation method according to an embodiment.

The first main surface 5 and the second main surface 6 are swung by the circular motion, so that an overlapping area c in which sections having different profiles overlap one another as shown in FIG. 1B can be obtained from the exiting light $L_2$ based on the entering light $L_1$. When the overlapping area c is selectively extracted by selection means (not shown) such as a slit provided separately from the optical device 1 and operative to define at least either one of the position and the cross-sectional shape of the exiting light $L_2$, laser light $L_3$ having an averaged profile can be obtained with reduced deterioration of optical characteristics and reduced loss of energy. More specifically, the above-mentioned swing angle as well as the angle, the thickness, the material and the like of the optical member 1 can be selected in view of the overlapping area c corresponding to the laser light $L_3$.

If a swing mechanism constructed in this manner is inserted at an intermediate position in an optical path of a light irradiation apparatus, fluctuations of the optical axis can be produced. According to such construction, it is possible to obtain an advantage similar to that of a conventional homogenizer, and in addition, the mounting position of a fluctuation production mechanism relative to the optical axis does not need strict mounting position accuracy, so that the fluctuation production mechanism can be easily mounted. Even if a deviation occurs in an adjusted optical axis due to trouble, strict position adjustment of the swing mechanism is not necessary, so that the deviation can be coped with by the simple operation of confirming the positional relationship between the swing axis and the optical axis. Furthermore, if the swing mechanism is constructed and designed to give a margin to the fluctuation amplitude of a beam, adjustment itself may also be omitted even if a variation occurs in the profile of the beam.

In addition, the angle of the first main surface 5 relative to the optical axis of the entering light $L_1$, i.e., the tilt angle of the optical member 2, is variable, i.e., adjustable, so that such angle can be suitably selected on the basis of a combination of the thickness, the constituent material and the like of the optical member 2 according to desired optical characteristics, for example, a desired spot diameter and a desired size of the overlapping area c to be averaged. In the present embodiment, as to the deviation width w between the entering light $L_1$ and the exiting light $L_2$, the tilt angle is desirably selected so that the overlapping area c can be ensured. In addition, if, for example, either one of the swing means 3 and the support member 4 is constructed to be bendable as well as swingable, i.e., rotatable, the optical member 2 can be moved out of the optical path of the entering light L1 after desired directional light, for example, the laser light $L_3$ has been obtained. Accordingly, it is possible to provide a construction suitable for light irradiation which does not use the optical device 1 according to the present embodiment, for example, light irradiation in applications in which variations of energy in the profile of laser light do not become a problem.

Figure 3:
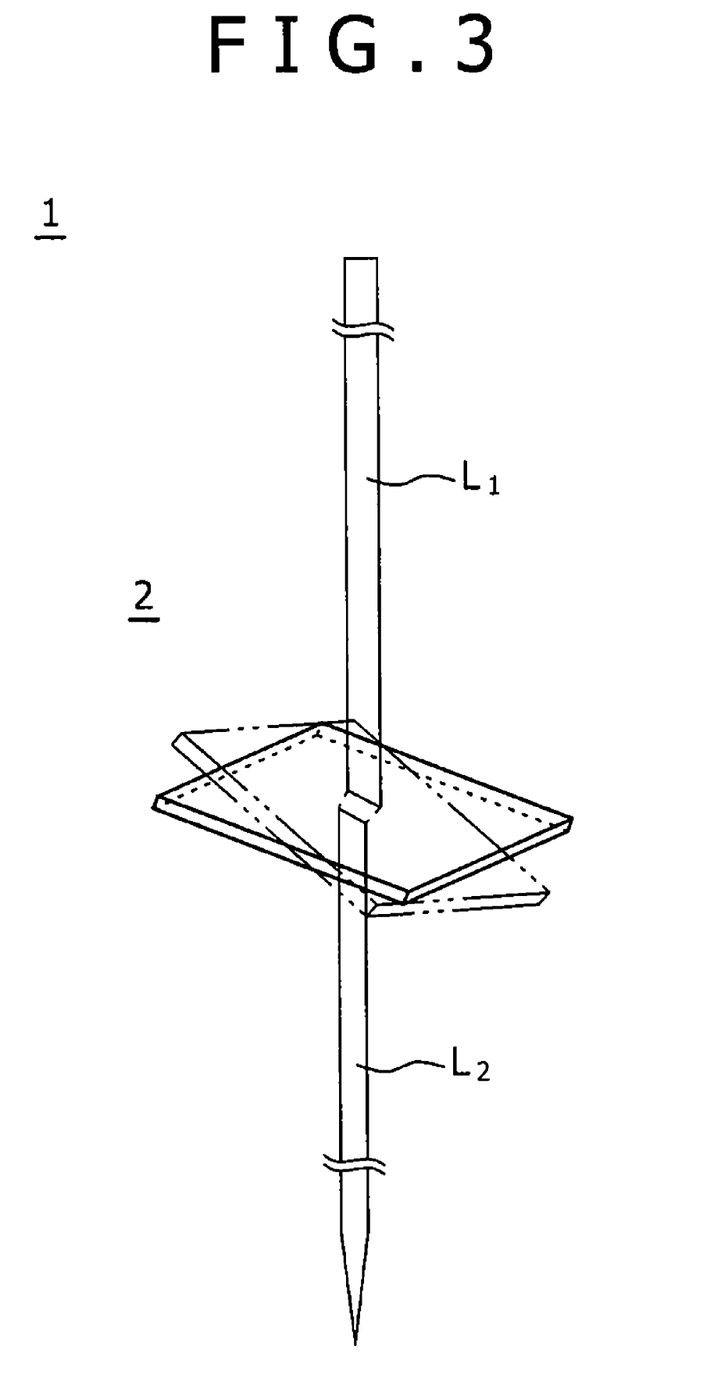
FIG. 3 is a schematic diagram for explaining the optical device according to another embodiment.

In addition, in the above description of the present embodiment, reference has been made to the case where the swing axis of the swing means 3 in the optical device 1 is approximately parallel to the optical axis of directional light. However, the optical device according to the present invention is not limited to the optical device 1, and can use various types of swing constructions capable of realizing improved optical characteristics such as averaged energy in profiles. More specifically, for example, the kind of actuator and the swing mechanism are not limited to the above-mentioned ones as long as they have a construction capable of varying the angle made with the optical axis by the optical member 2. As shown in FIG. 3 by way of example, the optical member 2 may be constructed for rotation back and forth about a swing axis approximately perpendicular to the optical path of the entering light $L_1$, within an angular range which does not deviate from the optical axis of the entering light $L_1$. In this construction as well, the first main surface 5 and the second main surface 6 are swung, so that an overlapping area in which sections having different profiles overlap one another can be obtained from laser light and a variation in the energy distribution of the laser light can be reduced through averaging obtained from the swing of the first and second main surfaces 5 and 6.

Light Irradiation Apparatus

Figure 4:
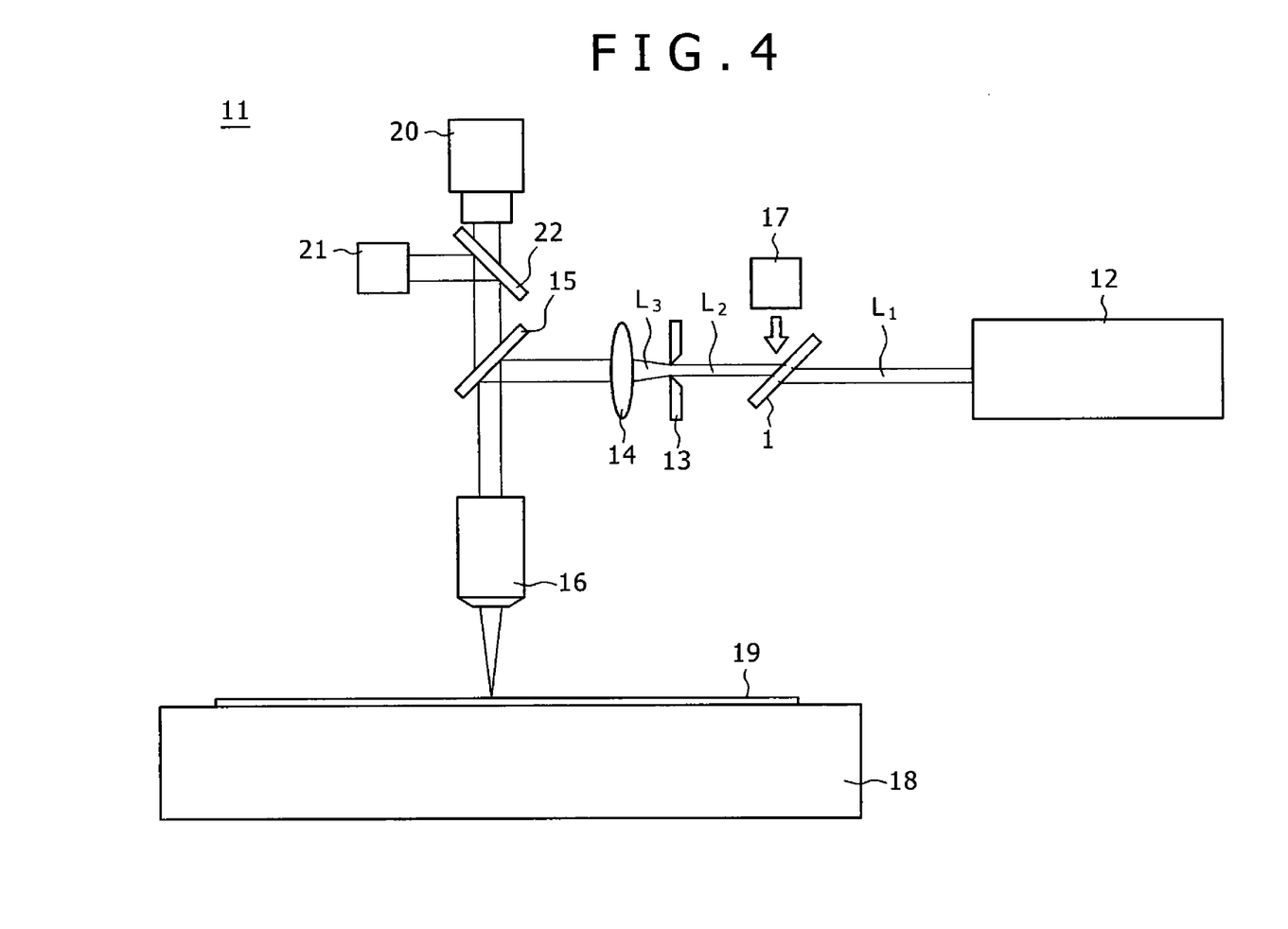
FIG. 4 is a schematic construction view showing a light irradiation apparatus according to an embodiment.

An embodiment of a light irradiation apparatus which has the above-mentioned optical device 1, will be described below. As shown in FIG. 4, a light irradiation apparatus 11 according to an embodiment at least has the optical device 1 which has the above-mentioned optical member 2 (not shown) and a directional light source which generates directional light refracted and transmitted through the optical member 2 of the optical device 1, for example, a laser light source 12.

The light irradiation apparatus 11 according to the present embodiment is one example of the light irradiation apparatus according to the present invention, and is a laser processor capable of irradiating laser light onto and performing laser processing on an irradiation target 19 on a stage 18. The light irradiation apparatus 11 has, in addition to the optical device 1 and the laser light source 12, selection means, such as a variable slit 13, for defining at least either one of the position and the cross-sectional shape of the exiting light $L_2$ refracted and transmitted through the optical device 1, optical elements, such as a lens 14, a mirror 15 and an objective lens 16, for introducing light passing through the selection means 13 into a section on the stage 18 in which the irradiation target 19 is arranged, i.e., a processing target section, and an illuminator 17 for improving the visibility of the slit 13. Furthermore, in the present embodiment, observation means 20 and an observation illuminator 21 for enabling observation of laser irradiation of the irradiation target 19 and the state of irradiation of the irradiation target 19 are provided together with a mirror 22.

In the present embodiment constructed in this manner, when the optical member 2 constituting the optical device 1 is continuously rotated about a swing axis approximately parallel to, for example, the optical paths of the entering light $L_1$ and the exiting light $L_2$ by the swing means 3 in a manner similar to that performed in the above-mentioned embodiment of the optical device, the first main surface 5 and the second main surface 6 arranged approximately in parallel with each other are swung, so that an overlapping area in which sections of laser light each having a different profile overlap one another can be obtained on the basis of the entering light $L_1$.

Furthermore, in the present embodiment, if the directional light $L_3$ is obtained by selectively extracting the overlapping area through, for example, the selection means 13 provided separately from the optical device 1 and operative to define at least either one of the position and the cross-sectional shape of the exiting light $L_2$, laser light having an averaged profile can be formed with reduced deterioration of optical characteristics and reduced loss of energy. More specifically, in this case, when directional light emitted from the light source 12 enters the optical device 1 as the entering light $L_1$, the entering light $L_1$ is refracted and transmitted through the optical device 1 and exits from the optical device 1 as the exiting light $L_2$. Then, the exiting light $L_2$ passes through the selection means 13 and is formed into the laser light $L_3$ whose energy intensity distribution, i.e., profile, has a variation reduced by averaging, and the laser light $L_3$ is irradiated onto the irradiation target 19 through an optical element.

As in the case of the above-mentioned optical device, if desired directional light such as the laser light $L_3$ is obtained but not necessary to perform laser processing, the optical member 2 (not shown) can be moved out of the optical path of the entering light $L_1$. However, according to the present embodiment, since the optical device 1 itself is constructed so as to be removable, after the removable of the optical device 1, the light irradiation apparatus 11 can be adapted to a construction suitable for light irradiation and laser processing which is not affected by variations of energy in the profiles of laser light. In this case, the light irradiation apparatus 11 can also be adapted to a construction in which a different optical element can be arranged in place of the optical device 1 in the section in which the optical device 1 is arranged.

Figure 5A:
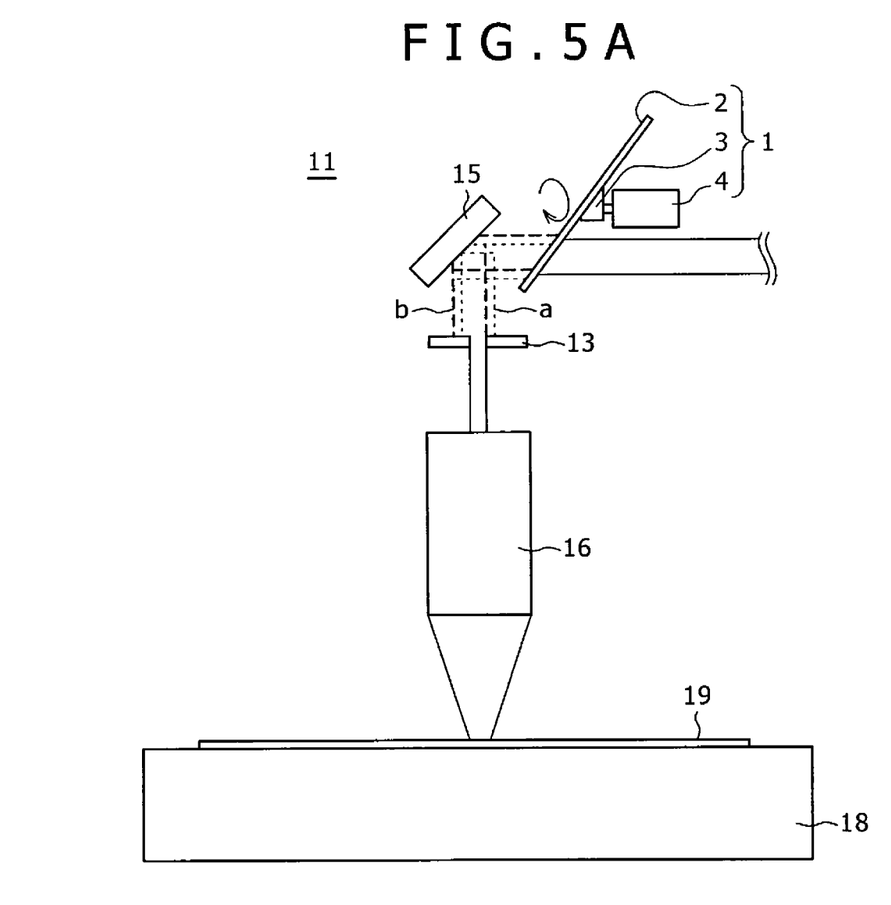
FIG. 5A is a schematic construction view showing the light irradiation apparatus according to another embodiment.

In addition, as shown in FIG. 5A, if the selection means 13 is disposed at a position closer to the irradiation target 19, for example, immediately in front of the objective lens 16, the contour of directional light, such as laser light, irradiated onto the irradiation target 19 can be made far clearer, so that laser light having a profile improved by the averaging of optical characteristics, for example, energy, can be selectively irradiated onto only a desired position of the irradiation target 19.

Figure 5B:
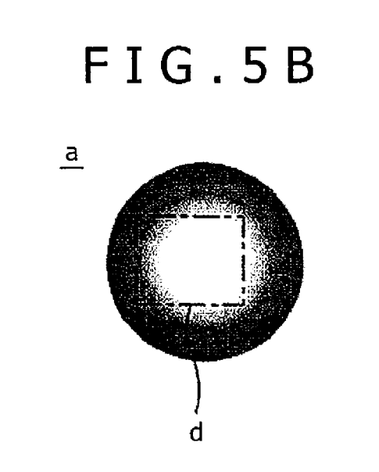
FIG. 5B is a first schematic diagram for explaining selection means provided in the embodiment shown in FIG. 5A.
Figure 5C:
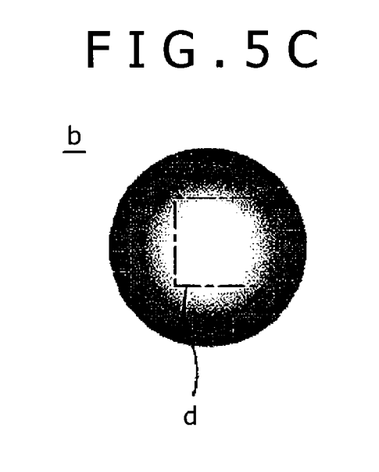
FIG. 5C is a second schematic diagram for explaining the selection means provided in the embodiment shown in FIG. 5A.

More specifically, in this case, as shown in FIGS. 5A to 5C, only components each of which corresponds to an aperture of the selection means 13 as shown by a dot-dashed line d arrive at the objective lens 16 along two optical paths, respectively, one of which is, for example, an optical path a corresponding to first transmitted light $L_2$ obtained when the optical member 2 is located at a particular position during swing, i.e., continuous rotation, and the other of which is, for example, an optical path b corresponding to second transmitted light $L_2$ obtained when the optical member 2 is located at a different position (a position to which the optical member 2 is rotated by 180° about the swing axis from the position where the optical member 2 is located when the optical path a is formed). Accordingly, laser light having a profile improved by the averaging of optical characteristics, for example, energy, can be introduced to a surface of the irradiation target 19 so that the external shape of a processing target area of the irradiation target 19 can be processed with high accuracy.

Light Irradiation Method

An embodiment of a light irradiation method will be described below with reference to the case in which the light irradiation apparatus 11 shown in FIGS. 5A to 5C is used as mentioned in the above description of the present embodiment.

First of all, the light irradiation method performs an optical-member arranging step of arranging the optical device 1 having the optical member 2 (not shown) in such a manner that the first main surface 5 and the second main surface 6 (not shown) approximately parallel to each other in the present embodiment are inclined with respect to the optical path $L_1$ of light emitted from the directional light source 12.

Then, the light irradiation method performs a light irradiation step of defining the optical path $L_1$ of the light from the directional light source 12 as the desired optical path $L_2$ by swinging the optical member 2, if necessary, through the selection means 13 such as a variable slit, selectively introducing only a desired positional shape of the optical path $L_2$ to the lens 14, forming desired irradiation light for the irradiation target 19 on the stage 18 through the mirror 15 and the objective lens 16, and irradiating the desired irradiation light onto the irradiation target 19. According to the above-mentioned light irradiation method, the laser light $L_2$ exiting from the optical member 2 can be formed while being swung with its optical axis held in parallel with the optical path $L_1$, so that the irradiation energy of laser light to be applied to a processing target surface per unit time can be uniformized within the processing target surface of the irradiation target 19.

In addition, prior to the light irradiation step, it is desirable to start a swing of the optical member 2, i.e., a continuous rotational operation of the optical member 2 about the swing axis approximately parallel to the optical path $L_1$ or a back-and-forth rotational operation of the optical member 2 about the swing axis approximately parallel to the optical path $L_1$, so as to swing the first main surface 5 and the second main surface 6 constituting the optical member 2 so that the optical member 2 makes an angular change with respect to the optical axis. However, if it is not particularly necessary to consider the stability of the rotational state of the optical member 2, such rotational operation may be started at the same time as or later than light irradiation as long as there is no particular problem.

In addition, in the case where the optical device 1 is removable from the light irradiation apparatus 11 or the optical member 2 constituting the optical device 1 is movable out of the optical path $L_1$, it is necessary to perform the optical-member arranging step immediately before the light irradiation step is performed, as mentioned in the above description of the present embodiment. However, in the case where the optical member 2 is mounted integrally with the optical device 1 and is difficult to remove, the optical-member arranging step can be performed by mounting of the optical device 1 during manufacture of the apparatus.

Specific Embodiments

Figure 6A:
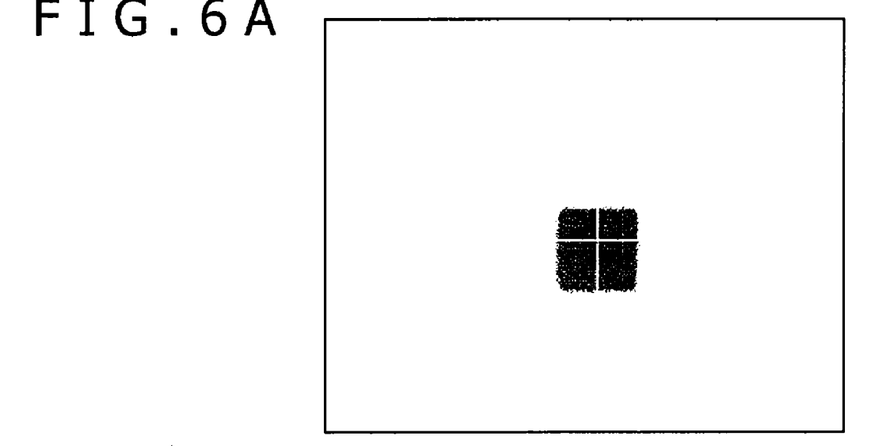
FIG. 6A is a photograph of an irradiation target obtained by the light irradiation method according to the embodiment.

Specific embodiments will be described below. FIG. 6A shows the result obtained by performing the processing of forming an aperture in an aluminum thin film of thickness 500 nm by irradiating the aluminum thin film with laser light of wavelength 390 nm, pulse width 3 picoseconds, and irradiation energy 0.13 mJ/cm$^2$, by means of the light irradiation method using the optical device according to the present invention mentioned in the above description of the embodiments. As can be seen from the result, although actual irradiation energy can be considered to be approximately 0.12 mJ/cm$^2$ when the energy loss of laser light passing through the optical member 2 is taken into account, desired processing can be achieved without the film remaining unprocessed, and generation of dust due to the processing is hardly observed.

Figure 6B:
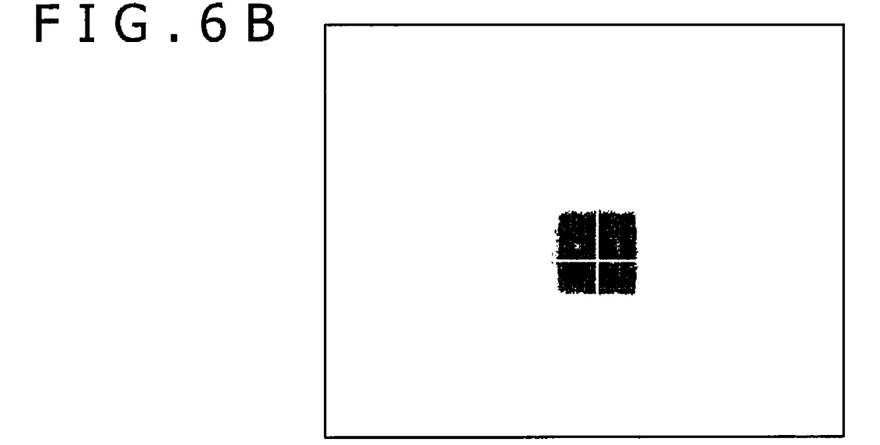
FIG. 6B is a first schematic diagram of an irradiation target obtained by a method in a related art.
Figure 6C:
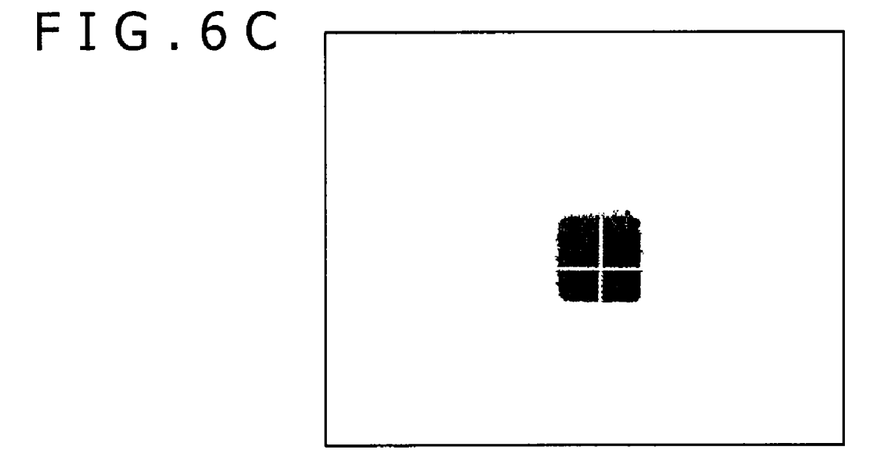
FIG. 6C is a second schematic diagram of the irradiation target obtained by the method in a related art.

On the other hand, when the processing of forming an aperture in the same aluminum thin film is performed by irradiating the aluminum thin film with laser light of wavelength 390 nm, pulse width 3 picoseconds, and irradiation energy 0.13 mJ/cm$^2$ by means of a conventional light irradiation method without the use of the optical device according to the present invention, the film remains partially unprocessed as shown in FIG. 6B. In addition, when the processing of forming an aperture in the same aluminum thin film is performed by irradiating the aluminum thin film with laser light of wavelength 390 nm, pulse width 3 picoseconds, and irradiation energy 0.15 mJ/cm$^2$ by means of a conventional light irradiation method without the use of the optical device according, there is no film remaining unprocessed, but a large amount of dust adhering to the periphery of the aperture formed by the processing is observed as shown in FIG. 6B.

From the above-mentioned results, it can be confirmed that according to the light irradiation method using the optical device according an embodiment, it is possible to perform laser irradiation and laser processing with far higher accuracy and reliability with less irradiation energy, by using laser light having an improved directional light profile, i.e., uniformized energy.

As mentioned above in the description of the embodiments, it is possible to improve the optical characteristics of light from a directional light source such as a laser, as to at least any one of spot shape, spot size, light amount and energy profile. In addition, the nonuniformity of irradiation energy on a processing target surface due to the nonuniformity of the profile of directional light can be ameliorated with the averaging of energy, so that the processing accuracy and the processing reliability of a process using laser light can be improved, and furthermore, costs required for the construction, i.e., manufacture, of the apparatus can be reduced compared to, for example, a construction using a homogenizer. In addition, even if a deviation of the optical axis or a variation of a profile occurs, the time required for troubleshooting can be reduced compared to, for example, the case where a homogenizer is used, so that productivity can be improved in mass production as well.

In addition, a loss in the energy of a beam section blocked by a slit and a decrease in the energy density of laser light used for irradiation with an enlarged beam width can be prevented so that far higher energy utilization efficiency can be obtained. The size of laser light can also be freely changed by increasing an effective beam spot diameter by using a swing of the optical member, so that desired optical characteristics such as a desired beam diameter can be obtained without the use of a split in various applications.

The numerical conditions, such as the kind and the amount of material used, processing time and size, referred to in the above description of the embodiments are merely suitable examples, and the dimensional shape and the arrangement relationship in each of the drawings used in the above description are schematically shown. More specifically, the present invention is not limited to any of the embodiments.

For example, the directional light source may also be an LED, and the purpose of light irradiation need not be limited to processing and can also be applied to illumination or the like. In this case, the first and second main surfaces constituting the optical member need not necessarily be approximately parallel to each other for the purpose of forming a desired optical path.

In addition, for example, the light source itself may not be directional, and need only to have the ability to apply directivity to laser light before the laser light reaches the optical member. Each of the above-mentioned continuous rotational operation and back-and-forth rotational operation can be increased or decreased in rotational speed, and can also be combined with a stationary state.

The wavelength and the pulse width of the entering light $L_1$ are not limited, but in the above-mentioned processing using laser light, a suitable wavelength range is approximately 266 nm to 1064 nm and a suitable pulse width is the femtosecond order to the nanosecond order. In addition, there is a tendency that as the pulse width is made larger, the amount of production or re-adhesion of dust becomes larger, but in the case of the light irradiation method according to the present invention, a pulse width of the femtosecond to nanosecond order can also be selected according to the kind of material constituting the irradiation target.

The material of the irradiation target is not limited to aluminum, and can also use not only a general metal but also silicon oxide or silicon nitride. The material of the optical member 2 is not limited to glass, and can be suitably selected within a range centered at, for example, a refractive index of 1.4 to 2.2, on the basis of transmissivity and a refractive index relative to light of desired wavelength. In addition, if the above-mentioned overlapping area is not necessary, light irradiation can also be performed by forming the optical path of exiting light into, for example, a ring-like shape opened in its center. Furthermore, the present invention can be modified and changed in various ways; for example, a circular shape is selected as the shape of the optical member 2 in view of balance in swing, but, for example, a planar shape having a square main surface can also be selected so long as the shape does not deviate from the optical path of the above-mentioned entering light.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical device comprising:
   an optical member having a first main surface and a second main surface, which respectively serve as an entrance surface and an exit surface for light from a directional light source, said optical member made of a material having a refractive index greater than 1; and
   a support member at least including swing means for the optical member,
   wherein the first and second main surfaces of the optical member swingable by the support member are supported by the support member in a state of being inclined with respect to an optical path of the light from the directional light source, and
   wherein the swing means allows for continuous rotation of the optical member about a swing axis substantially parallel to the optical path.

2. The optical device according to claim 1, wherein the first and second main surfaces are substantially in parallel with each other.

3. The optical device according to claim 1, wherein at least the optical device is movable out of the optical path of the light from the directional light source.

4. The optical device according to claim 1, wherein each of tilt angles of the first and second main surfaces are variable.

5. The optical device according to claim 1, wherein the directional light source is a laser light source.

6. A light irradiation apparatus comprising:
   a directional light source; and
   an optical device which defines an optical path of light from the directional light source,
   wherein the optical device has:
   an optical member having a first main surface and a second main surface, which respectively serve as an entrance surface and an exit surface for light from the directional light source, wherein said optical member is made of a material having a refractive index greater than 1; and
   a support member at least including swing means for the optical member,
   wherein the first and second main surfaces of the optical member swingable by the support member are supported by the support member in a state of being inclined with respect to the optical path of the light from the directional light source, and
   wherein the swing means allows for continuous rotation of the optical member about a swing axis substantially parallel to the optical path.

7. The light irradiation apparatus according to claim 6, wherein the first and second main surfaces are substantially in parallel with each other.

8. The light irradiation apparatus according to claim 6, wherein the optical device is removable.

9. The light irradiation apparatus according to claim 6, further comprising selection means which defines at least one of a position and a cross-sectional shape of the light from the directional light source.

10. The light irradiation apparatus according to claim 6, further comprising observation means that observes the light from the directional light source.

11. An optical device comprising:
    an optical member having a first main surface and a second main surface, which respectively serve as an entrance surface and an exit surface for light from a directional light source, said optical member made of a material having a refractive index greater than 1; and
    a support member at least including swing means for the optical member,
    wherein the first and second main surfaces of the optical member swingable by the support member are supported by the support member in a state of being inclined with respect to an optical path of the light from the directional light source, and
    wherein the swing means allows for back-and-forth rotation of the optical member about a swing axis substantially perpendicular to the optical path.

12. A light irradiation apparatus comprising:
    a directional light source; and
    an optical device which defines an optical path of light from the directional light source,
    wherein the optical device has:
    an optical member having a first main surface and a second main surface, which respectively serve as an entrance surface and an exit surface for light from the directional light source, wherein said optical member is made of a material having a refractive index greater than 1; and
    a support member at least including swing means for the optical member,
    wherein the first and second main surfaces of the optical member swingable by the support member are supported by the support member in a state of being inclined with respect to the optical path of the light from the directional light source, and
    wherein the swing means allows for back-and-forth rotation of the optical member about a swing axis substantially perpendicular to the optical path.

* * * * *